(12) United States Patent
Aston

(10) Patent No.: US 8,504,904 B2
(45) Date of Patent: Aug. 6, 2013

(54) VALIDATING OBJECTS IN A DATA STORAGE SYSTEM

(75) Inventor: Christopher J. Aston, Bucks (GB)

(73) Assignee: Hitachi Data Systems Engineering UK Limited, Bracknell, Berkshire (GB)

( * ) Notice: Subject to any disclaimer, the term of this patent is extended or adjusted under 35 U.S.C. 154(b) by 1269 days.

(21) Appl. No.: 12/015,192

(22) Filed: Jan. 16, 2008

(65) Prior Publication Data

US 2009/0183056 A1 Jul. 16, 2009

(51) Int. Cl.
*G06F 11/10* (2006.01)

(52) U.S. Cl.
USPC .................................................... 714/807

(58) Field of Classification Search
USPC .................. 714/799, 801, 805, 807
See application file for complete search history.

(56) References Cited

U.S. PATENT DOCUMENTS

| | | | | |
|---|---|---|---|---|
| 5,390,197 | A * | 2/1995 | MacDonald et al. | 714/782 |
| 5,402,430 | A * | 3/1995 | Asai et al. | 714/800 |
| 5,566,193 | A * | 10/1996 | Cloonan | 714/802 |
| 5,819,292 | A | 10/1998 | Hitz et al. | 707/203 |
| 5,875,202 | A * | 2/1999 | Venters et al. | 714/807 |
| 6,108,812 | A * | 8/2000 | Born | 714/807 |
| 6,321,358 | B1 * | 11/2001 | Anderson | 714/763 |
| 6,467,060 | B1 * | 10/2002 | Malakapalli et al. | 714/758 |
| 7,024,618 | B2 * | 4/2006 | Luick | 714/800 |
| 7,191,382 | B2 * | 3/2007 | James et al. | 714/769 |
| 7,194,672 | B2 * | 3/2007 | Kim et al. | 714/758 |
| 7,200,235 | B1 * | 4/2007 | Trimberger | 380/277 |
| 7,203,890 | B1 * | 4/2007 | Normoyle | 714/768 |
| 7,818,535 | B1 | 10/2010 | Bono et al. | 711/173 |
| 2003/0182301 | A1 | 9/2003 | Patterson et al. | 707/102 |
| 2005/0097141 | A1 | 5/2005 | Loafman et al. | 707/200 |

FOREIGN PATENT DOCUMENTS

WO WO 03/105026 12/2003

OTHER PUBLICATIONS

International Searching Authority, Invitation to Pay Additional Fees and, Where Applicable, Protest Fee (partial search report)—International Application No. PCT/US2008/079308, dated Jul. 9, 2009, 7 pages.
International Searching Authority, International Search Report—International Application No. PCT/US2008/079308, dated Sep. 17, 2009, together with the Written Opinion of the International Searching Authority, 17 pages.
Nelson, Mark, *File Verification Using CRC*, from http://www.dogma.net/markn/articles/crcman/crcman.htm, 1992, pp. 1-17.
Hill, Robin, FileRepair, from http://filerepair.sourceforge.net, 2004, pp. 1-3.

* cited by examiner

*Primary Examiner* — James C Kerveros
(74) *Attorney, Agent, or Firm* — Sunstein Kann Murphy & Timbers LLP

(57) ABSTRACT

Objects stored in a storage system (such as a file server system) are protected by multiple levels of validation. Each chunk of an object is associated with a chunk validator, and an object validator is computed for the object based on the chunk validators. The object validator is stored in the storage system and may be used at various times to validate the object, for example, upon a startup of the storage system, upon taking a checkpoint or "snapshot" of the status of the storage system, or at other appropriate times.

22 Claims, 11 Drawing Sheets

VALIDATING OBJECTS IN A DATA STORAGE SYSTEM

FIELD OF THE INVENTION

The present invention relates generally to data storage systems, and more particularly to validating objects in a data storage system.

BACKGROUND OF THE INVENTION

Certain filesystem metadata data structures are critical to the correct functionality of the filesystem. It is desirable to be able to detect corruption of these structures easily and reliably.

Some level of validation can be provided by embedding validation information such as a CRC in each block of filesystem metadata. However, this only provides validation of the block in isolation. It is possible that a valid block A and a valid block B may combine to form an invalid structure AB.

A more rigorous validator would be one which validated the structure as a whole. One method for achieving this would be to calculate a CRC across the entire structure. However, such a solution has the disadvantage that the entire structure would have to be read (to calculate the new CRC value) whenever any part of the structure changed. Another option would be to keep a checksum of the entire structure. This would allow the new checksum to be calculated without having to read the entire structure, since the checksum of the old data could be removed from the overall checksum and then the checksum of the new data inserted. However, a checksum provides only a weak level of protection for large structures since, for example, two errors may cancel each other out, leaving a correct checksum despite the incorrect contents.

Some prior art systems maintain a list of the CRCs for the files in a storage system (e.g., http://www.dogma.net/markn/articles/crcman/crcman.htm) or for the blocks in a file (e.g., http://filerepair.sourceforge.net/), the contents of which are hereby incorporated herein by reference in their entireties.

SUMMARY OF THE INVENTION

In embodiments of the present invention, objects stored in the storage system (such as a file server system) are protected by multiple levels of validation. Each chunk of an object is associated with a chunk validator, and an object validator is computed for the object based on the chunk validators, specifically by combining the chunk validators using a reversible operation such as addition, multiplication, or bitwise exclusive-OR, to name but a few. The object validator is stored in the storage system and may be used at various times to validate the object, for example, upon a startup of the storage system, upon taking a checkpoint or "snapshot" of the status of the storage system, or at other appropriate times.

In accordance with one aspect of the invention there is provided a method of providing for validation of an object having a plurality of object chunks stored in a storage system, where each object is associated with an object validator. The method involves computing an object validator for the object using a reversible operation to combine the chunk validators, whereby the object validator can be updated based on at least one of an old chunk validator and a new chunk validator for a single chunk; and storing the object validator for the object.

In accordance with another aspect of the invention there is provided apparatus for providing for validation of an object having a plurality of object chunks stored in a storage system, where each object is associated with an object validator. The apparatus includes a storage system configured to store objects; and a validation system configured to compute an object validator for the object using a reversible operation to combine the chunk validators and store the object validator, whereby the object validator can be updated based on at least one of an old chunk validator and a new chunk validator for a single chunk.

In various embodiments, the chunk validators may be computed using a checksum, a cyclic redundancy check, an exclusive-OR, a hash, and/or an error correction code, to name but a few. The reversible operation may include addition, multiplication, bitwise exclusive-OR, to name but a few. In one particular embodiment, the chunk validators may be 32-bit cyclic redundancy checks and the object validator may be a 64-bit sum of the 32-bit cyclic redundancy checks.

An object may be validated by validating each object chunk using its respective stored chunk validator; computing a verification object validator using the chunk validators; and comparing the verification object validator with the stored object validator to determine validity of the object.

The object validator for an object may be updated when a new chunk is added to the object, when an old chunk is removed from the object, or when a chunk is modified. When a new chunk is added to the object, the object validator may be updated by computing and storing a new chunk validator for the new chunk; computing a new object validator for the object using the stored object validator and the new chunk validator (e.g., by adding the new chunk validator to the stored object validator); and storing the new object validator for the object. When an old chunk is removed from the object, the object validator may be updated by computing a new object validator for the object using the stored object validator and the old chunk validator associated with the removed chunk (e.g., by subtracting the old chunk validator from the stored object validator); and storing the new object validator for the object. When a chunk is modified, the object validator may be updated by computing and storing a new chunk validator for the modified chunk; computing a new object validator for the object using the stored object validator, the new chunk validator, and an old chunk validator stored for the chunk (e.g., by subtracting the old chunk validator from the stored object validator and adding the new chunk validator to the stored object validator); and storing the new object validator for the object.

Object validators may be stored in various ways within the storage system such as, for example, within the objects themselves, within a storage system root node structure (e.g., a dynamic superblock of a filesystem in which the object is stored), and/or within an indirection object associated with the object, to name but a few.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
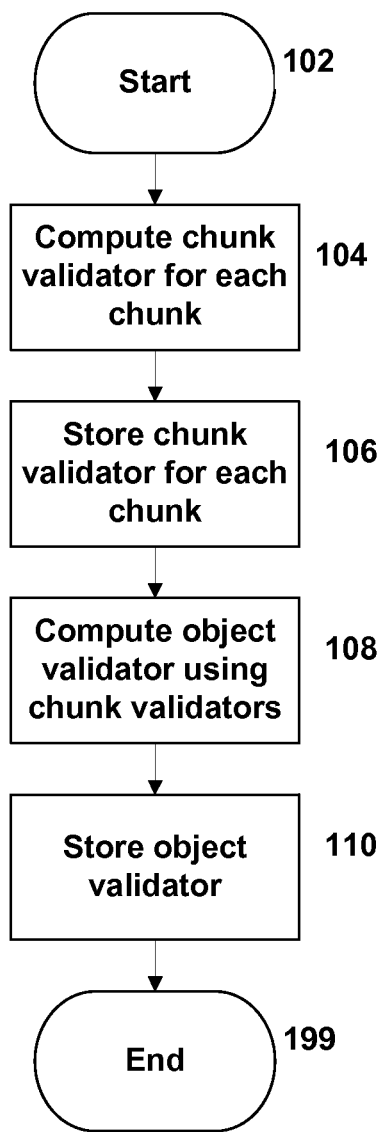
FIG. 1 is a flowchart showing the process of storing an object in a data storage system.

Definitions. As used in this description and the accompanying claims, the following terms shall have the meanings indicated, unless the context otherwise requires:

An "object" is a unit of information stored in a data storage system. In the context of a filesystem, objects may include system objects (e.g., a root directory object, a free block bitmap object) as well as file objects (e.g., user file objects). An object may be implemented using a tree structure having a root node that points to various other structures, such as storage blocks that contain content, direct nodes that point to storage blocks, or indirect nodes that point to other indirect nodes or to direct nodes. Ultimately, objects are stored in one or more storage devices, such as disk drives.

A "chunk" is a portion of an object that is stored in one or more storage devices. An object is typically composed of a plurality of chunks. A chunk may, but is not required to, coincide with a storage block of a block storage device. An object may include chunks having different sizes, storage locations, and other characteristics.

In embodiments of the present invention, objects stored in the storage system (such as a file server system) are protected by multiple levels of validation. Each chunk of an object is associated with a chunk validator, and an object validator is computed for the object based on the chunk validators. The object validator is stored in the storage system and may be used at various times to validate the object, for example, upon a startup of the storage system, upon taking a checkpoint or "snapshot" of the status of the storage system, or at other appropriate times.

More specifically, a chunk validator is computed and stored for each object chunk, and an object validator is computed from the chunk validators and stored in the data storage system. The object validator is computed using a reversible operation such that, when a particular chunk is modified, the object validator can be updated based on the old and new chunk validators for that chunk without having to perform a computation over multiple chunks, for example, by removing the old chunk validator (i.e., the chunk validator prior to the modification) from the object validator and combining the new chunk validator (i.e., computed following the modification) to the object validator. In this way, the object validator can be updated without having to compute the entire object validator from all chunk validators. The object validator may be stored within the object itself (e.g., within the root node) or may be stored elsewhere in the data storage system (e.g., within a dynamic superblock or within an object table).

In exemplary embodiments, the object validator is computed by summing the chunk validators of all object chunks. For example, if the chunk validators are 32-bit cyclic redundancy check (CRC) values, then the object validator may be the 64-bit sum of the 32-bit CRCs of all chunks. When a particular chunk is modified, the object validator can be updated by subtracting the old chunk validator (i.e., the chunk validator prior to the modification) from the object validator and adding the new chunk validator (i.e., computed following the modification) to the object validator, resulting in an object validator that is the sum of all chunk validators without having to actually sum all of the chunk validators.

Each chunk can be validated individually by computing a chunk verification validator for the chunk and comparing the chunk verification validator with the stored chunk validator for the chunk. In complex data storage systems, however, it may be insufficient to simply validate each chunk. Certain types of errors can cause chunks to be dropped from and/or added to objects, for example, by corruption of pointers in the object structure. Thus, even if every chunk referenced in an object structure is valid based on its chunk validator, it is still possible for the object as a whole to be invalid. Therefore, the object can be validated by computing an object verification validator using the chunk validators of all chunks referenced in the object structure and comparing the object verification validator with the stored object validator for the object.

Storing Objects

FIG. 1 is a logic flow diagram depicting general logic for storing an object in a storage system in accordance with various embodiments of this invention. The logic begins at execution block 102. For each chunk associated with the object (e.g., via links in an object tree structure), a chunk validator is computed at execution block 104, and the chunk validator is stored in the system (e.g., within the chunk itself) at execution block 106. An object validator is then computed using the chunk validators at execution block 108, and this object validator is stored in the system at execution block 110. The logic ends at execution block 199.

Chunk validators may be computed using any of a variety of mechanisms, including, but in no way limited to, checksum algorithms, cyclic redundancy check (CRC) algorithms, bitwise exclusive-OR (XOR) functions, hashing functions, parity checking functions, and error correcting codes, to name but a few. Different mechanisms have different properties that may be appropriate for different implementations and environments. For example, some mechanisms are computationally simple but may not provide significant protection (e.g., checksum or XOR), while others are more computationally intensive but may provide more protection (e.g., CRC or hashing functions). Some mechanisms may be well-suited for software implementations while others may be well-suited for hardware implementations.

Similarly, object validators may be computed using any of a variety of mechanisms, although, in embodiments of the present invention, the mechanism used for computing object validators is reversible. Exemplary mechanisms for computing object validators include, but are in no way limited to, addition, multiplication, and bitwise XOR, which are reversible using subtraction, division, and bitwise XOR, respectively.

In specific embodiments of the present invention, the process of storing an object will be, for the most part, determined by the processes used to compute the chunk validators and the object validator. In an exemplary embodiment of the present invention, the chunk validators are computed using a 32-bit CRC algorithm, and the object validator for an object is computed by summing the chunk validators associated with the object chunks into a 64-bit sum. Such an embodiment provides a high level of error detection capability while still allowing the object validator to be updated following a structure change without requiring that all chunks (or all chunk validators) be accessed. Of course, if other types of validators are used, the process used for storing objects will vary accordingly.

Figure 2:
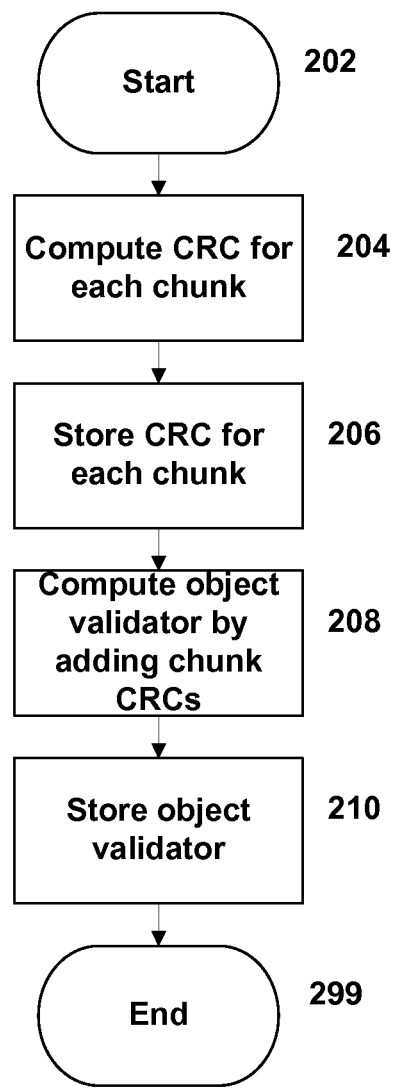
FIG. 2 is a flowchart showing the process of storing an object in a data storage system, according to a specific embodiment of the present invention.
Figure 7:
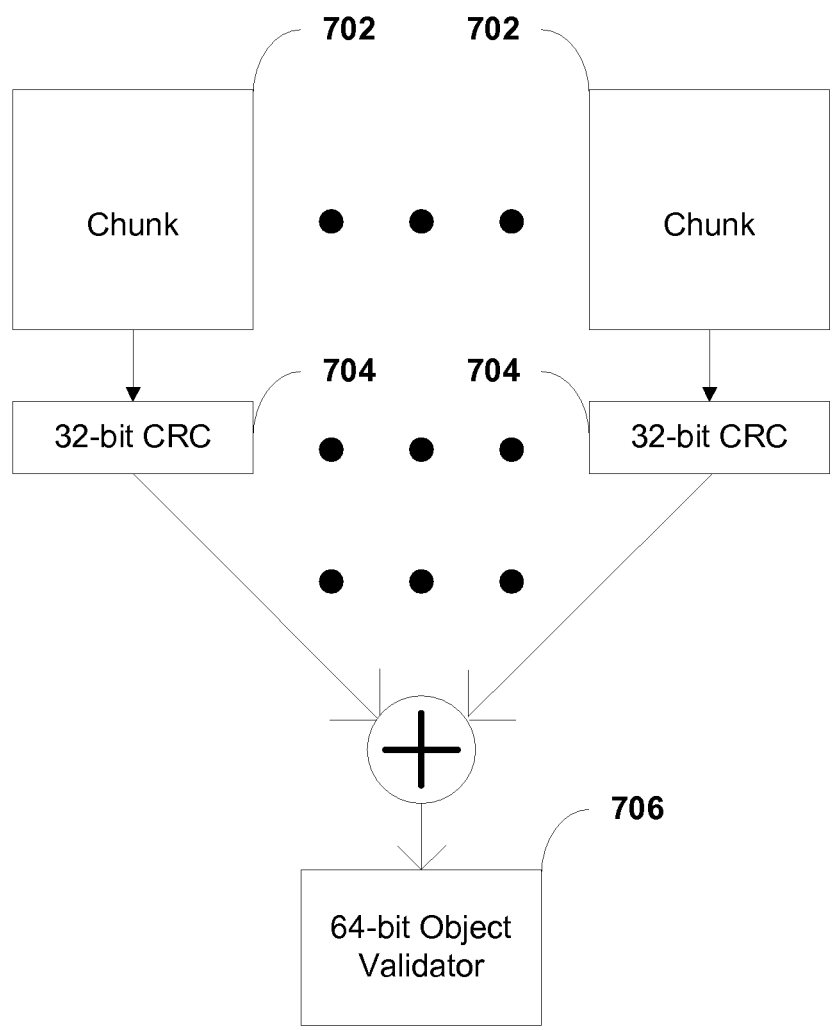
FIG. 7 is a diagram showing the process of computing an object validator, according to a specific embodiment of the present invention.

An exemplary process for storing an object in a storage system is now described with reference to FIGS. 2 and 7. The logic begins at execution block 202. For each chunk 702 associated with the object, a chunk CRC 704 is computed at execution block 204, and the chunk CRCs 704 are stored in the system at execution block 206. CRCs 704 are then added together to form a 64-bit object validator 706 at execution block 208. Object validator 706 is then stored in the system at execution block 210. The logic ends at execution block 299.

Validating Objects

In embodiments of the present invention, the validity of a stored object may be checked using the stored chunk validators and object validator. First, each chunk associated with the object (e.g., via links in an object tree structure) is validated by computing a chunk validator for the chunk and comparing the computed chunk validator with the stored chunk validator for that chunk. If any of the chunks are invalid, then the entire object is considered to be invalid, in which case an error recovery mechanism may be activated (e.g., generating an alert to an operator and/or reverting to an earlier version of the object or the entire filesystem). If all chunks are found to be valid individually, then the entire object is validated by computing a verification object validator using the chunk validators and comparing the verification object validator with the stored object validator. If the verification object validator matches the stored object validator, then the object is considered to be valid. If, however, the verification object validator does not match the stored object validator, then the object is considered to be invalid, in which case an error recovery mechanism may be activated (e.g., generating an alert to an operator and/or reverting to an earlier version of the object or the entire filesystem). An object might become invalid, for example, due to corruption of the object tree structure to omit a chunk from the object or add a chunk that is not really part of the object.

Figure 3:
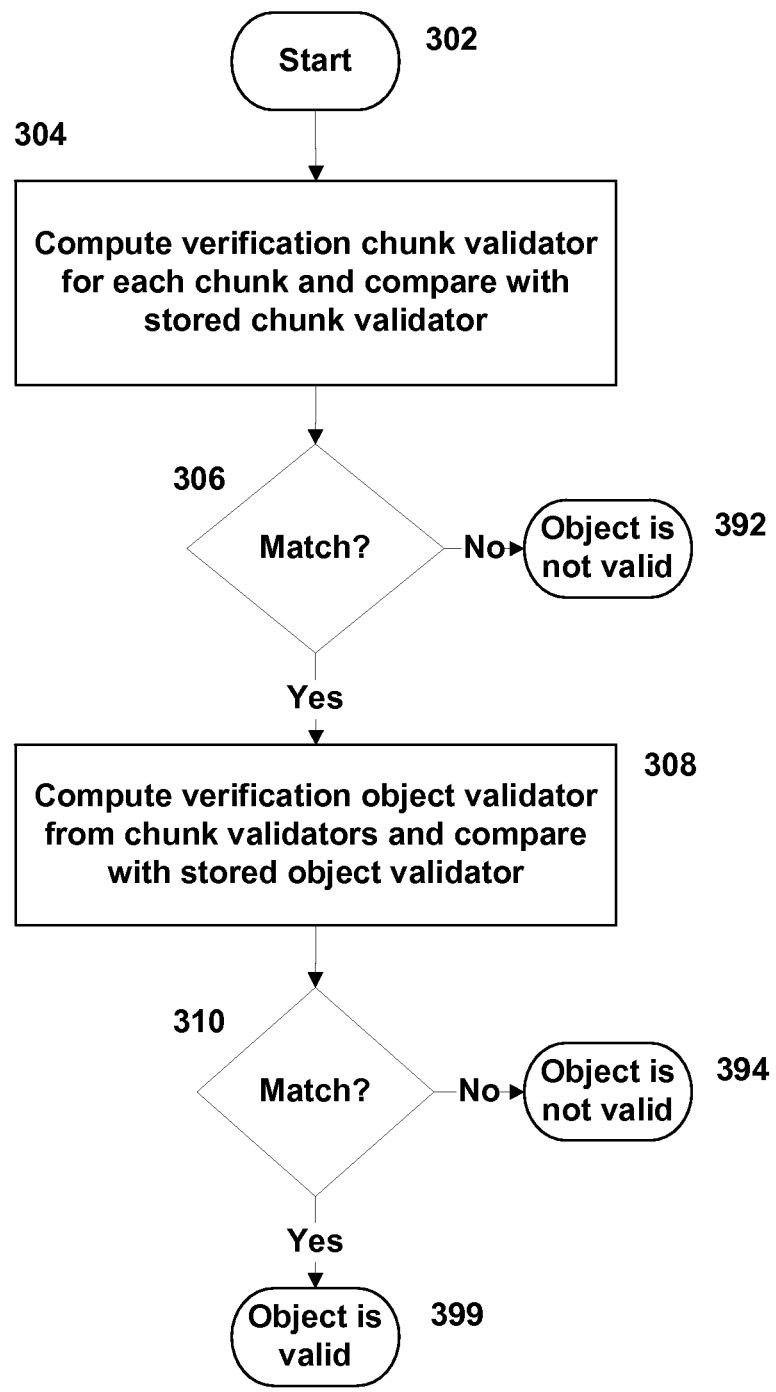
FIG. 3 is a flowchart showing the process of checking the validity of an object stored in a data storage system.

FIG. 3 is a logic flow diagram depicting general logic for verifying an object in accordance with various embodiments of the invention. The logic begins at execution block 302. For each chunk associated with the object, a verification chunk validator is computed and compared with a stored chunk validator at execution block 304. If any of the verification chunk validators does not match its respective stored chunk validator at execution block 306, then the object is considered to be invalid at execution block 392. If all of the chunks are valid, however, a verification object validator is computed using the chunk validators and compared with the stored object validator at execution block 308. If the verification object validator does not match the stored object validator in execution block 310, then the object is considered to be invalid at execution block 394. If the verification object validator matches the stored object validator in execution block 310, then the entire object is considered to be valid in execution block 399.

In specific embodiments of the present invention, the process of validating an object will be, for the most part, determined by the process used to store the object. Thus, in an exemplary embodiment of the invention, chunks are validated by computing a 32-bit CRC and comparing the computed CRC with the stored CRC for the chunk, and the object is validated by computing a 64-bit sum of the 32-bit chunk CRCs and comparing the 64-bit sum with the stored 64-bit object validator. Of course, if other types of validators are used, the process for validating objects will vary accordingly.

Figure 4:
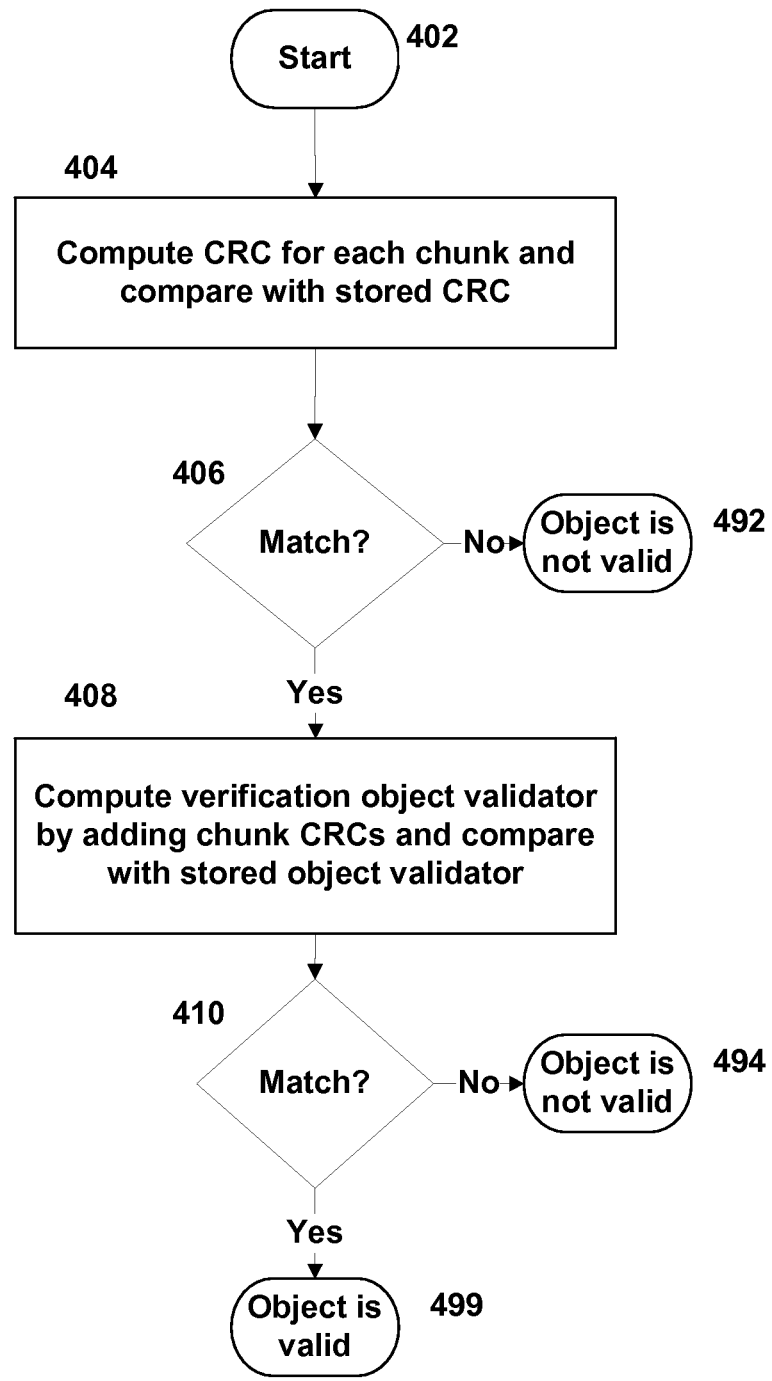
FIG. 4 is a flowchart showing the process of checking the validity of an object stored in a data storage system, according to a specific embodiment of the present invention.

An exemplary process for validating an object is now described with reference to FIG. 4. For each chunk associated with the object, a chunk CRC is computed and compared with a corresponding stored CRC for the chunk at execution block 404. If the computed CRC for any chunk does not match its corresponding stored CRC at execution block 406, then the object is considered to be invalid at execution block 492. If all of the chunks are valid, however, a 64-bit verification object validator is computed by summing the 32-bit chunk CRCs and is compared with the 64-bit stored object validator at execution block 408. If the verification object validator does not match the stored object validator at execution block 410, then the object is considered to be invalid at execution block 494. If, however the verification object validator matches the stored object validator at execution block 410, then the object is considered to be valid at execution block 499.

Modifying Objects

In embodiments of the present invention, when an object is modified (e.g., a chunk is added, deleted, or modified), the object validator for the object is updated. For example, if a new chunk is added to the object, then a chunk validator is computed and stored for the new chunk, and an updated object validator is computed for the object by adding the chunk validator to the saved object validator. If an existing chunk is removed from the object, then an updated object validator is computed for the object by subtracting from the saved object validator the chunk validator associated with the removed chunk. If an existing chunk is modified, then a new chunk validator is computed for the chunk, and an updated object validator is computed for the object by removing the old chunk validator from, and adding the new chunk validator to, the saved object validator.

Figure 5:
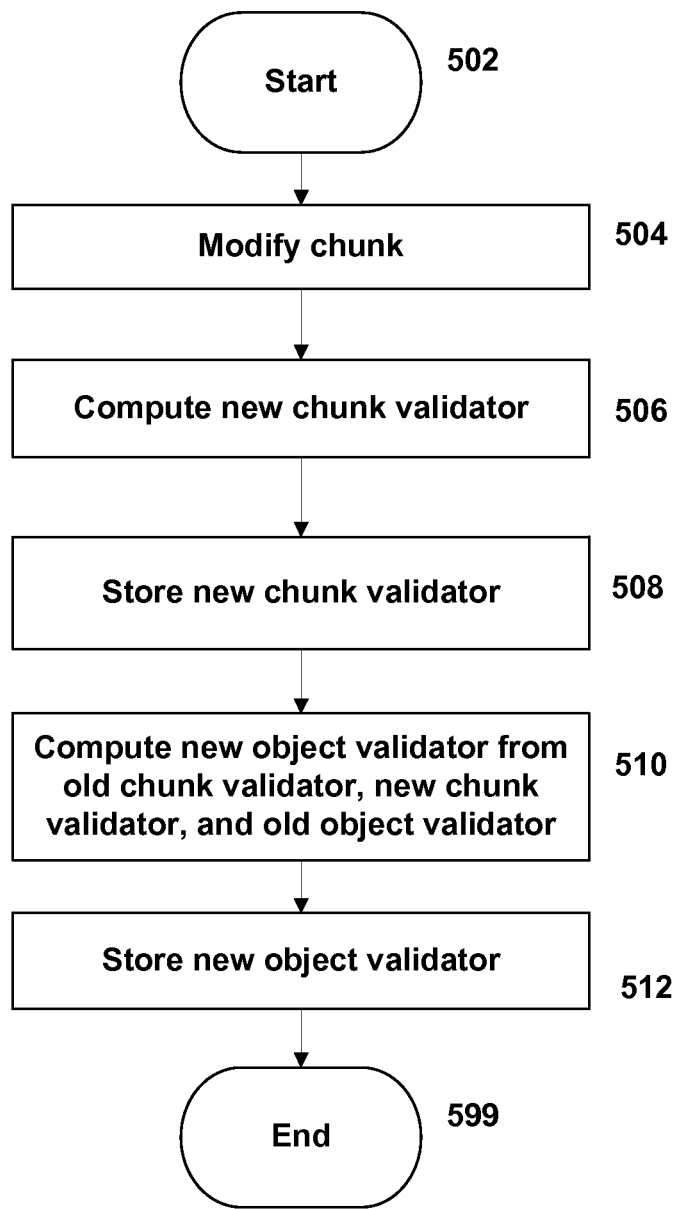
FIG. 5 is a flowchart showing the process of modifying an object stored in a data storage system.

FIG. 5 is a logic flow diagram depicting general logic updating an object validator when a chunk is modified in accordance with various embodiments of this invention. The logic begins at execution block 502. When a chunk is modified at execution block 504, a new chunk validator is computed for the chunk at execution block 506, and the new chunk validator is stored at execution block 508. An updated object validator is then computed using the old chunk validator, the new chunk validator, and the saved object validator at execution block 510. The updated object validator is stored for the object at execution block 512. The logic ends at execution block 599.

In specific embodiments of the present invention, the process of updating an object validator will be, for the most part, determined by the process used to store the object. Thus, in an exemplary embodiment of the invention, the object validator is updated by removing an old 32-bit CRC from the saved 64-bit object validator and/or adding a new 32-bit CRC to the saved 64-bit object validator. Of course, if other types of validators are used, the process used for updating object validators will vary accordingly.

Figure 6:
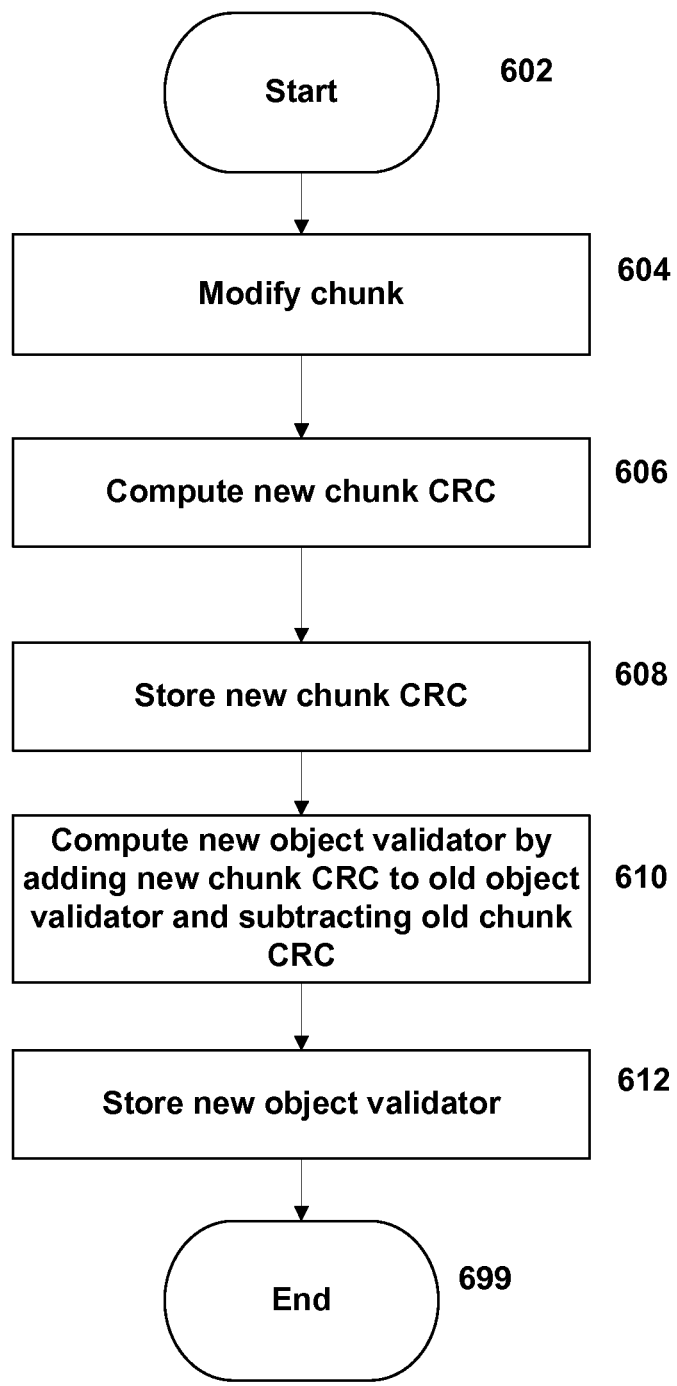
FIG. 6 is a flowchart showing the process of modifying an object stored in a data storage system, according to a specific embodiment of the present invention.

An exemplary process for updating an object validator when upon modification of a chunk is now described with reference to FIG. 6. The logic begins at execution block 602. When a chunk is modified at execution block 604, a new 32-bit CRC is computed for the chunk at execution block 606. The new 32-bit CRC is stored for the chunk at execution block 608. A new 64-bit object validator is computed for the object by adding the new 32-bit CRC to the saved object validator and subtracting the old 32-bit CRC for the chunk from the saved object validator at execution block 610. The new object validator is stored at execution block 612. The logic ends at execution block 699.

It should be noted that the process for updating the object validator is similar when adding or removing a chunk. Specifically, upon adding a new chunk to the object, a 32-bit CRC is computed and stored for the new chunk, and the 32-bit CRC is added to the saved 64-bit object validator. On the other hand, upon removing a chunk from the object, the old 32-bit CRC for the chunk is subtracted from the saved 64-bit object validator.

It should also be noted a chunk may be "modified" by either modifying the existing chunk or by creating a modified version of the chunk and updating the object structure to point to the modified chunk instead of the chunk it replaces.

Exemplary Filesystem Embodiments

As discussed above, the object validator for an object may be stored in any of various locations within a storage system. In an exemplary embodiment, each object is implemented as a tree structure having a root node, so the object validator may be stored in the object root node.

Figure 8:
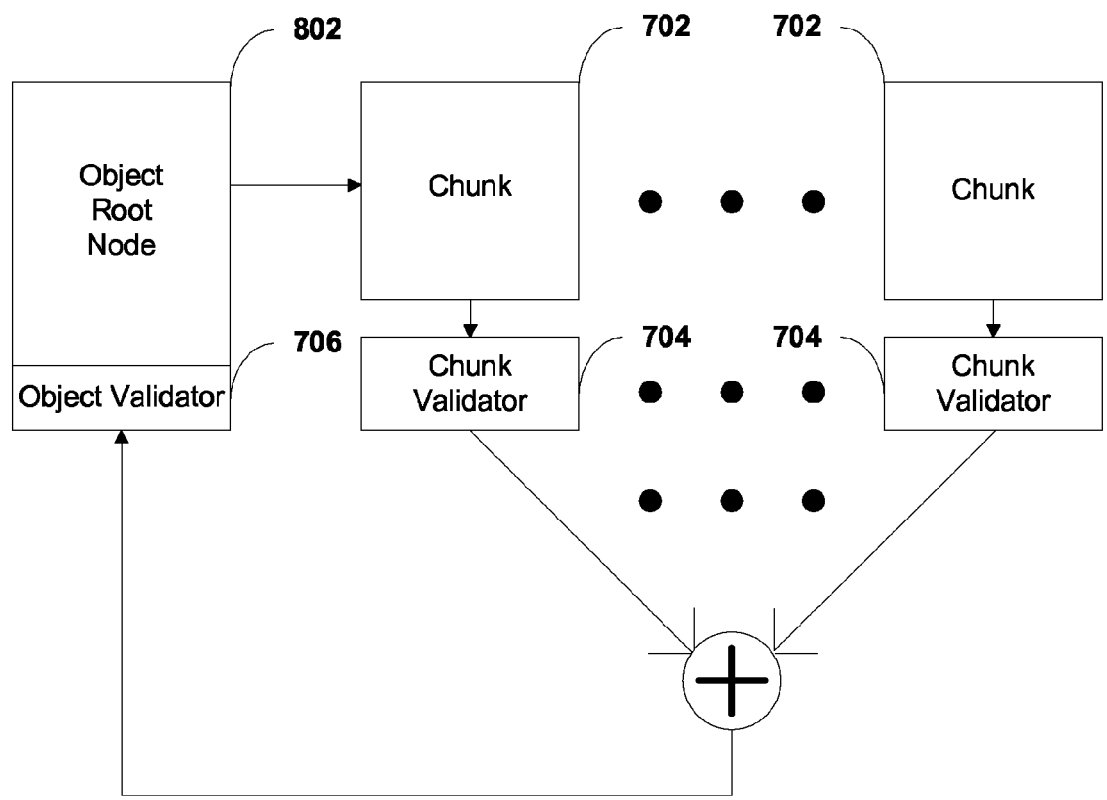
FIG. 8 is a diagram showing how an object validator is stored, according to a specific embodiment of the present invention.

FIG. 8 is a schematic block diagram showing storage of the object validator in the object root node in accordance with an exemplary embodiment of the present invention. A chunk validator 704 is computed for each chunk 702, and the chunk validators 704 are combined (e.g., by summing) to form the object validator 706, which is stored in the object root node 802.

Also in an exemplary embodiment, an entire filesystem containing multiple objects is also implemented as a tree structure having a special root node referred to as a dynamic superblock (DSB) as well as various other objects accessible directly or indirectly from the DSB.

Figure 9:
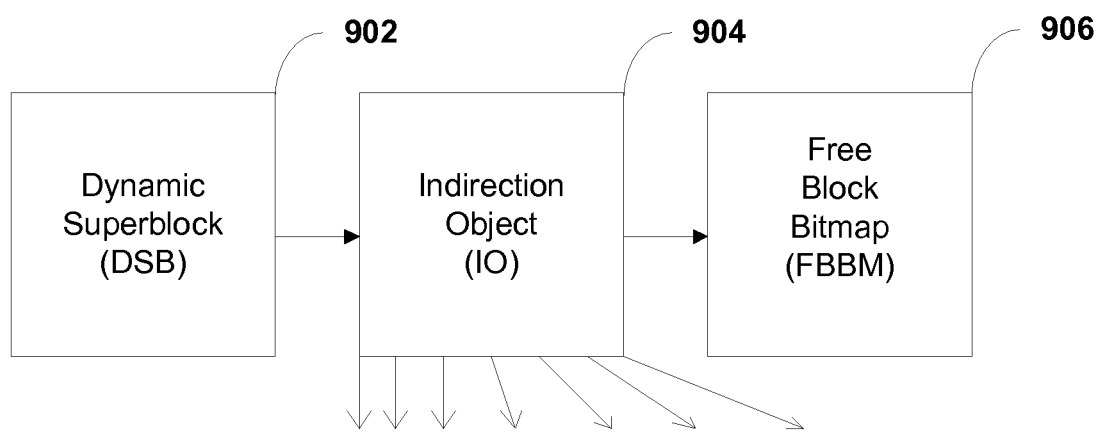
FIG. 9 is a diagram showing the structure of an exemplary filesystem that could be employed, according to a specific embodiment of the present invention.

FIG. 9 is a schematic block diagram showing the general format of a filesystem in accordance with an exemplary embodiment of the present invention. In this example, the filesystem includes a dynamic superblock (DSB) 902, an indirection object 904, and various other filesystem objects and structures including, among others, a free block bitmap 906. The DSB 902 is the root of the filesystem, and, in this example, is stored at a fixed location so it can easily be located (certain embodiments include multiple DSBs so that different versions of the filesystem may be maintained). The indirection object 904, the free block bitmap 906 and other filesystem objects are stored using separate tree structures, each having its own root node and other elements. These objects may be stored at varying locations in the storage system. Thus, the DSB 902 includes a pointer to the indirection object 904, and the indirection object 904 in turn includes pointers to other filesystem objects including the free block bitmap 906.

Because the indirection object 904, the free block bitmap 906, and other filesystem objects are "objects" that have tree structures with root nodes, the object validators for such objects may be stored in the respective root nodes as discussed above. Alternatively, the object validators for certain objects may be stored directly in the DSB 902 or in other critical filesystem objects such as, for example, the indirection object 904.

Figure 10:
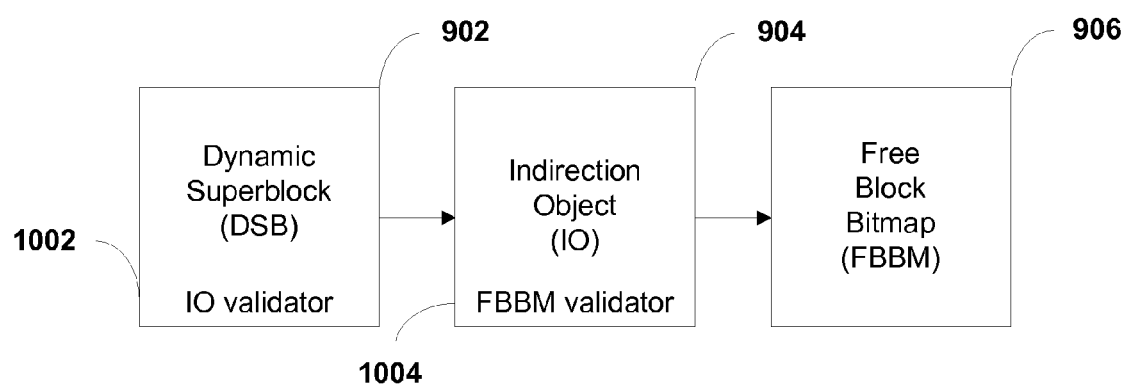
FIG. 10 is a diagram showing how object validators for specific filesystem components are stored, according to a specific embodiment of the present invention.

FIG. 10 is a schematic block diagram showing the object validator for the indirection object 904 stored in the DSB 902 and the object validator for the free block bitmap 906 stored in the indirection object 904, in accordance with an exemplary embodiment of the present invention.

Figure 11:
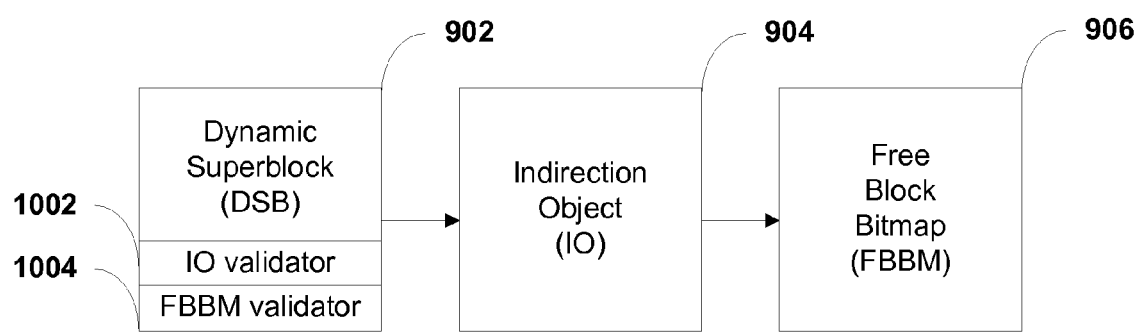
FIG. 11 is a diagram showing how object validators for specific filesystem components are stored, according to a specific embodiment of the present invention.

FIG. 11 is a schematic block diagram showing the object validators for both the indirection object 904 and the free block bitmap 906 stored in the DSB 902, in accordance with an exemplary embodiment of the present invention.

Alternate Embodiments

Object validators could certainly be provided for every object in a data storage system, but it is envisioned that, in practice, object validators may be limited to a subset of the objects in the system, particularly those that are critical to system operation. Thus, the decision as to which objects are to be protected using object validators is an implementational one that may very on a case-by-case basis. Similarly, the decision as to when to validate objects using the object validators is an implementational one that may vary on a case-by-case basis. For example, objects may be validated upon system startup, upon taking a checkpoint or "snapshot," on a scheduled basis (e.g., every day at a certain time), or at other appropriate times. Some considerations as to which objects to protect using object validators and when to validate objects using object validators include the importance of the object to system operation; the system overhead of creating, maintaining, and checking validators and resultant impact on system performance; and impact on storage space/speed, to name but a few. Using object validators only for system-critical components is likely to be a reasonable trade-off between system reliability and performance impact.

Exemplary embodiments of the present invention are described above with reference to an object validator that is the sum of the chunk validators so that an obsolete chunk validator can be removed from the object validator using subtraction. It should be noted, however, that the present invention is not limited to the use of addition/subtraction for the object validator. Other techniques, including reversible operations such as multiplication/division or bitwise exclusive-OR (XOR), may alternatively be used for the object validator. Thus, for example, an object validator may be computed by multiplying the chunk validators, and a particular chunk validator may be removed from the resulting object validator using a division operation. Similarly, an object validator may be computed by combining the chunk validators using an XOR function, and a particular chunk validator may be removed from the resulting object validator using an XOR operation. Other techniques may become apparent to the skilled artisan based on the teachings of this patent application, and all such techniques are intended to fall within the scope of this patent application.

It should be noted that an object may be composed of different types of chunks (e.g., data blocks, tree nodes, etc.), and the chunk validators for the different types of chunks may be combined into a single object validator as discussed above. Furthermore, it should be noted that different types of chunk validators may be computed for different types of chunks (e.g., 32-bit CRC for data blocks, 16-bit checksum for tree nodes), and the different types of chunk validators may also be combined into a single object validator as discussed above.

It should be noted that embodiments of the present invention are not limited to the specific types of storage systems, filesystems, objects, and data structures described above for exemplary embodiments. Embodiments of the present invention may be employed in various types of data storage systems including, but not limited to, file servers, web servers, and RAID systems, to name but a few.

It should also be noted that logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention. For example, in the logic flow diagrams shown in FIGS. 5 and 6, the new chunk validator does not necessarily need to be stored prior to computation of the new object validator.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other Programmable Logic Device), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method of providing for validation of an object stored in a storage system, the object having a plurality of object chunks, each object chunk associated with a chunk validator, the method comprising:
   computing a chunk validator for each chunk forming the object;
   storing each chunk and the computed chunk validator for the chunk;
   computing an object validator for the object using a reversible operation to combine the chunk validators;
   storing the object validator for the object; and
   validating the object by (i) computing a verification chunk validator for each chunk and comparing the computed verification chunk validator with the stored chunk validator for the chunk and (ii) computing a verification object validator from the chunk validators and comparing the computed verification object validator with the stored object validator.

2. A method according to claim 1, wherein the chunk validator for each chunk includes at least one of a checksum, a cyclic redundancy check, an exclusive-OR, a hash, and an error correction code.

3. A method according to claim 1, wherein the reversible operation includes at least one of:
   addition;
   multiplication; and
   bitwise exclusive-OR.

4. A method according to claim 1, wherein the chunk validators are 32-bit cyclic redundancy checks, and wherein the object validator includes a 64-bit sum of the 32-bit cyclic redundancy checks.

5. A method according to claim 1, further comprising, after a new chunk associated with a new chunk validator is added to the object:
   computing a new object validator for the object using the stored object validator and the new chunk validator; and
   storing the new object validator for the object.

6. A method according to claim 5, wherein computing a new object validator for the object using the stored object validator and the new chunk validator comprises:

combining the new chunk validator with the stored object validator using the reversible operation.

7. A method according to claim 1, further comprising, after an old chunk associated with an old chunk validator is removed from the object:
   computing a new object validator for the object using the stored object validator and the old chunk validator; and
   storing the new object validator for the object.

8. A method according to claim 7, wherein computing a new object validator for the object using the stored object validator and the old chunk validator comprises:
   removing the old chunk validator from the stored object validator in accordance with the reversible operation.

9. A method according to claim 1, further comprising, after an object chunk associated with an old chunk validator is modified so as to be associated with a new chunk validator:
   computing a new object validator for the object using the stored object validator, the new chunk validator, and the old chunk validator; and
   storing the new object validator for the object.

10. A method according to claim 9, wherein computing a new object validator for the object using the stored object validator, the new chunk validator, and the old chunk validator comprises:
    removing the old chunk validator from the stored object validator in accordance with the reversible operation; and
    combining the new chunk validator with the stored object validator using the reversible operation.

11. A method according to claim 1, wherein storing the object validator comprises one of:
    storing the object validator within the object;
    storing the object validator within a storage system root node structure; and
    storing the object validator within an indirection object associated with the object.

12. Apparatus for providing for validation of an object stored in a storage system, the object having a plurality of object chunks, each object chunk associated with a chunk validator, the apparatus comprising:
    a storage system configured to store objects; and
    a validation system configured to compute a chunk validator for each chunk forming the object; store each chunk and the computed chunk validator for the chunk; compute an object validator for the object using a reversible operation to combine the chunk validators and store the object validator for the object; and validate the object by (i) computing a verification chunk validator for each chunk and comparing the computed verification chunk validator with the stored chunk validator for the chunk and (ii) computing a verification object validator from the chunk validators and comparing the computed verification object validator with the stored object validator.

13. Apparatus according to claim 12, wherein the chunk validator for each chunk includes at least one of a checksum, a cyclic redundancy check, an exclusive-OR, a hash, and an error correction code.

14. Apparatus according to claim 12, wherein the reversible operation includes one of:
    addition;
    multiplication; and
    bitwise exclusive-OR.

15. Apparatus according to claim 12, wherein the chunk validators are 32-bit cyclic redundancy checks, and wherein the object validator includes a 64-bit sum of the 32-bit cyclic redundancy checks.

16. Apparatus according to claim 12, wherein, after a new chunk associated with a new chunk validator is added to the object, the validation system is configured to compute a new object validator for the object using the stored object validator and the new chunk validator and store the new object validator for the object.

17. Apparatus according to claim 16, wherein the validation system is configured to compute the new object validator for the object by combining the new chunk validator with the stored object validator using the reversible operation.

18. Apparatus according to claim 12, wherein, after an old chunk associated with an old chunk validator is removed from the object, the validation system is configured to compute a new object validator for the object using the stored object validator and the old chunk validator and store the new object validator for the object.

19. Apparatus according to claim 18, wherein the validation system is configured to compute the new object validator by removing the old chunk validator from the stored object validator in accordance with the reversible operation.

20. Apparatus according to claim 12, wherein, after an object chunk associated with an old chunk validator is modified so as to be associated with a new chunk validator, the validation system is configured to compute a new object validator for the object using the stored object validator, the new chunk validator, and the old chunk validator and store the new object validator for the object.

21. Apparatus according to claim 20, wherein the validation system is configured to compute the new object validator by removing the old chunk validator from the stored object validator in accordance with the reversible operation and combining the new chunk validator with the stored object validator using the reversible operation.

22. Apparatus according to claim 12, wherein the validation system is configured to store the object validator in one of:
    the object;
    a storage system root node structure; and
    an indirection object associated with the object.

* * * * *